United States Patent
Mizoguchi et al.

(10) Patent No.: US 6,970,686 B2
(45) Date of Patent: Nov. 29, 2005

(54) DIVERSITY SYSTEM AND DIVERSITY METHOD

(75) Inventors: Yoshitaka Mizoguchi, Fukuoka (JP); Akira Kisoda, Moriguchi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 397 days.

(21) Appl. No.: 10/438,276

(22) Filed: May 15, 2003

(65) Prior Publication Data

US 2004/0002307 A1 Jan. 1, 2004

(30) Foreign Application Priority Data

May 16, 2002 (JP) .............................. 2002-141565

(51) Int. Cl.[7] .............................. H04B 1/06; H04B 7/00
(52) U.S. Cl. ................ 455/273; 455/276.1; 455/277.1; 375/267; 375/347
(58) Field of Search .............................. 455/269, 272, 455/273, 276.1, 277.1, 277.2, 67.1, 67.16; 375/267, 346, 347

(56) References Cited

U.S. PATENT DOCUMENTS

| 4,326,294 A | * | 4/1982 | Okamoto et al. | ............ 455/275 |
| 4,512,034 A | * | 4/1985 | Greenstein et al. | ...... 455/276.1 |
| 5,930,248 A | * | 7/1999 | Langlet et al. | ............ 455/67.16 |
| 6,029,056 A | * | 2/2000 | Kiyanagi et al. | ........ 455/276.1 |

FOREIGN PATENT DOCUMENTS

| EP | 1 041 736 A | 10/2000 |
| JP | 2001-156738 A | 6/2001 |

* cited by examiner

Primary Examiner—Quochien B. Vuong
(74) Attorney, Agent, or Firm—Smith Patent Office

(57) ABSTRACT

A synchronous signal position detection unit detects symbol synchronous signals according to OFDM from the signals received by the respective antennas. A delay measurement unit measures a relative delay between the symbol synchronous signals for each antenna series and makes a notice to a memory unit via a delay amount notification unit. A diversity operation implementation unit temporally aligns the carrier data positions of the OFDM symbols for each antenna series so as to implement a space diversity operation.

14 Claims, 12 Drawing Sheets

DIVERSITY SYSTEM AND DIVERSITY METHOD

BACKGROUND OF THE INVENTION

1. Field of the Invention

The present invention relates to a diversity system and a diversity method for implementing space diversity using a carrier unit for OFDM (Orthogonal Frequency Division Multiplex) demodulation.

2. Discussion of the Related Art

In recent years, OFDM has been used as one mode of demodulation as a standard for digital television (Integrated Services Digital Broadcasting-T: ISDB-T), wireless LAN (IEEE 802.11a) or the like. The OFDM is a mode of modulating a great number of carriers that are orthogonal to each other with digital data to multiplex and transmit these modulated waves. In this OFDM mode, the transmitted OFDM signal is provided with a guard period that a portion of the transmitted waveform is copied. By utilizing this feature, the OFDM mode can prevent deterioration in the quality of signal received through multiple paths having a delay time not more than the guard period.

Ground wave digital TV broadcasting such as ISDT-T is also used for mobile reception such as a television receiver mounted in an automobile. In this case, frequency selective phasing occurs for mobile reception and the reception characteristics deteriorate due to Doppler shift or the like. In the case of analog broadcasting, a plurality of antennas are used for receiving signals at the time of mobile reception. Thus, a signal corresponding to a antenna series that enables better reception is selected in accordance with reception levels. This mode is referred to as selection diversity.

In contrast to this, selection or weighted combination can be carried out in digital broadcasting for each carrier of the OFDM signal, in addition to selection of the received RF signal or baseband signal that is carried out in the above described mode. This mode is referred to as selection and combination diversity.

One example of weighted combination will be described. A symbol received from a first antenna series in a symbol period at time t1 is denoted as S1 and a symbol received from a second antenna series is denoted as T1. When it is assumed that these symbols are modulated according to multiple value PSK, for example, the symbols T1 and S1 have the same phase angle and amplitude at the transmission end. When the imaginary number unit is denoted as j, the symbol S1 obtained at the reception end becomes a two dimensional vector S1=sx+jsy, and the symbol T1 obtained at the reception end becomes a two dimensional vector T1=tx+jty. When the reliability of the received symbol S1 is denoted as RS1 and the reliability of the received symbol T1 is denoted as RT1, the received symbol U1 on which weighted combination is carried out is represented as:

$$U1 = [RS1*(sx+jsy) + RT1*(tx+jty)]/(RS1+RT1).$$

Selection and combination diversity is to compare the vector U1 with a known vector that is the closest to the vector U1 and to estimate the transmitted signal. It is noted that this operation is carried out on data obtained by implementing an equalization process for the respective antenna series.

The above-described selection and combination diversity mode for selecting or weighted combining for each carrier of the OFDM signal utilizes a mode of using one antenna series as a master and the other antenna series as a slave among a plurality of antenna series. Thus, preservation of temporal synchronicity of carriers among antenna series is a prerequisite condition of the above-described selection and combination diversity mode.

In some cases, however, the reception condition of the master antenna series significantly deteriorates during reception, so that OFDM synchronicity is lost. In this case, a synchronous signal from the master to the slave is lost and reception becomes impossible even in the case the reception conditions of slave antennas are good. In contrast to this, the above-described problem does not arise in a mode of independently detecting the synchronous signal of the OFDM symbol by two antenna series.

Symbol synchronicity according to OFDM is generally implemented through correlation of the guard period with a portion of the OFDM waveform. The correlation waveform according to OFDM is independent of each antenna series; therefore, subtle differences in the correlation waveform of each series greatly affects the shift in the timing of the symbol synchronous signal. In particular, the timing of the symbol synchronous signal greatly varies among the antenna series under a mobile reception environment and there has been arisen a problem in that diversity use is difficult.

SUMMARY OF THE INVENTION

A diversity system of the present invention implements space diversity for each carrier in an OFDM signal demodulation system having a plurality of antennas. Symbol synchronous signal position detection units are provided for the respective antenna series, and detect symbol synchronous signals according to OFDM symbols. Carrier demodulators are provided for the respective antenna series, demodulate carriers according to OFDM, and calculate reliability of each of said carriers. A delay measurement unit measures the amount of relative delay between the antenna series on the basis of the symbol synchronous signals of the antenna series. A delay amount notification unit outputs the amount of relative delay obtained by said delay measurement unit. At least one memory unit temporarily holds carriers of the antenna series in which at least the position detection of a synchronous signal is early from the carriers according to OFDM demodulated by said carrier demodulators. A diversity operation implementation unit takes out the carriers held in the memory unit on the basis of the time period of correlation delay received from the delay amount notification unit. The diversity operation implementation unit temporally aligns the positions of the carriers of the antenna series in which a relative delay is occurred due to the condition of the transmission path and of the carriers taken out from the memory unit, and outputs carriers having improved reliability.

DETAILED DESCRIPTION OF THE PREFERRED EMBODIMENTS

A diversity system and the operational principle thereof (diversity method) according to the respective embodiments of the present invention will be described with reference to the drawings.

Figure 1:
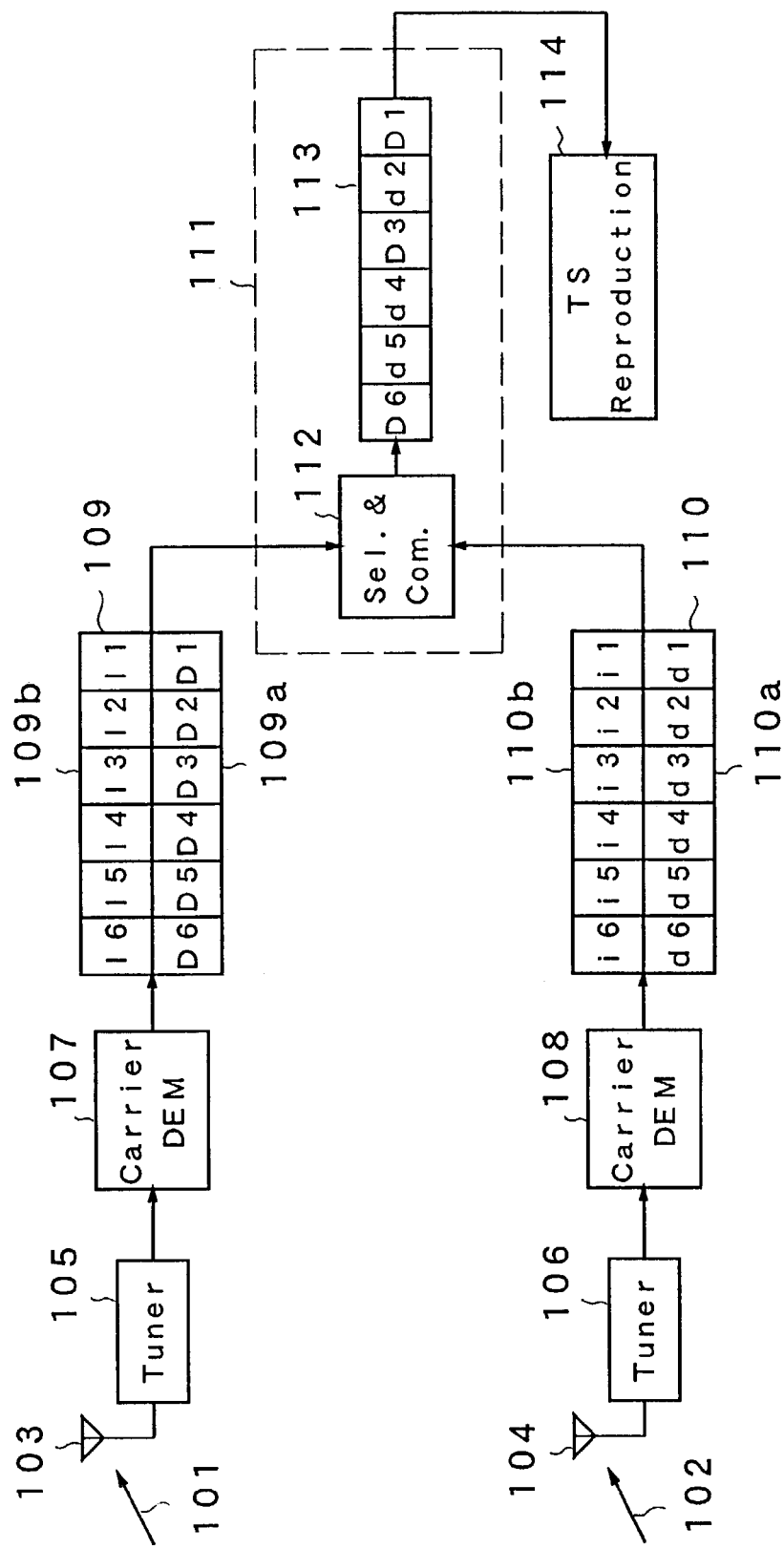
FIG. 1 is a diagram showing the configuration and operational principle of a basic diversity system in the case space diversity is implemented for each carrier.

FIG. 1 is a diagram showing the configuration and operational principle of a basic diversity system. Herein, the diversity system has a diversity mode in which two antenna series exist in order to simplify the description. A radio wave 101 including an OFDM signal reaches to an antenna 103. A radio wave 102 including the same OFDM signal reaches to an antenna 104. A tuner 105 selects the radio wave received by the antenna 103 and outputs the OFDM signal to a carrier demodulator 107. In addition, a tuner 106 selects the radio wave received by the antenna 104 and outputs the OFDM signal to a carrier demodulator 108.

The carrier demodulator 107 processes an orthogonal demodulation and an FFT and outputs a data sequence 109. The carrier demodulator 108 processes an orthogonal demodulation and an FFT and outputs a data sequence 110. Further, the carrier demodulator 107 calculates the reliability values of the respective carriers that have been demodulated using the received power or the like as a reference and outputs respective reliability values 109b to respective carriers 109a. The carrier demodulator 108 also calculates the reliability values of the respective carriers that have been demodulated using the received power or the like as a reference and outputs respective reliability values 110b to respective carriers 110a.

As described above, the data sequence 109 includes carriers D1, D2, . . . . The data sequence 110 includes carriers d1, d2, . . . . Herein, the D1 is the first carrier in the sequence of the antenna 103. The d1 is the first carrier in the sequence of the antenna 104. The reliability values of the carriers D1 and d1 are I1 and i1, respectively. The carriers D1 and d1 are compared in the diversity operation implementation unit 111 (hereinafter, referred to as DIV-operation unit) described below.

The DIV-operation unit 111 has a selection and combination unit 112. Carriers 109a, 110a and reliability values 109b, 110b are inputted to the selection and combination unit 112. The selection and combination unit 112 implements diversity in a predetermined selection combination mode (selection or weighted combination). The selection and combination unit 112 compares the reliability values 109b and 110b according to the respective carrier units and selects the carrier in the series having a higher reliability value, thereby implementing carrier diversity. Instead, the selection and combination unit 112 compares reliability values 109b and 110b according to the respective carrier units and implements weighted combination on the carriers according to the reliability values as described above. The DIV-operation unit 111 outputs the selected or combined carrier to a TS (Transport Stream) reproduction unit 114.

The example shown in FIG. 1 shows a case where the DIV-operation unit 111 selects carriers D1, d2, D3, d4, d5 and D6 and outputs the carriers to the TS reproduction unit 114. The TS reproduction unit 114 carries out error correction on the transferred carrier 113 so as to reproduce a Transport Stream.

Space diversity using such a carrier unit is implemented, whereby the reception performance is improved. As described in the related art, however, there is arisen a problem in that temporal synchronicity between the antenna series of the carriers is not held due to a shift in the reception time of the carrier synchronous signals between different antenna series. This problem will be described with reference to FIG. 2.

Figure 2:
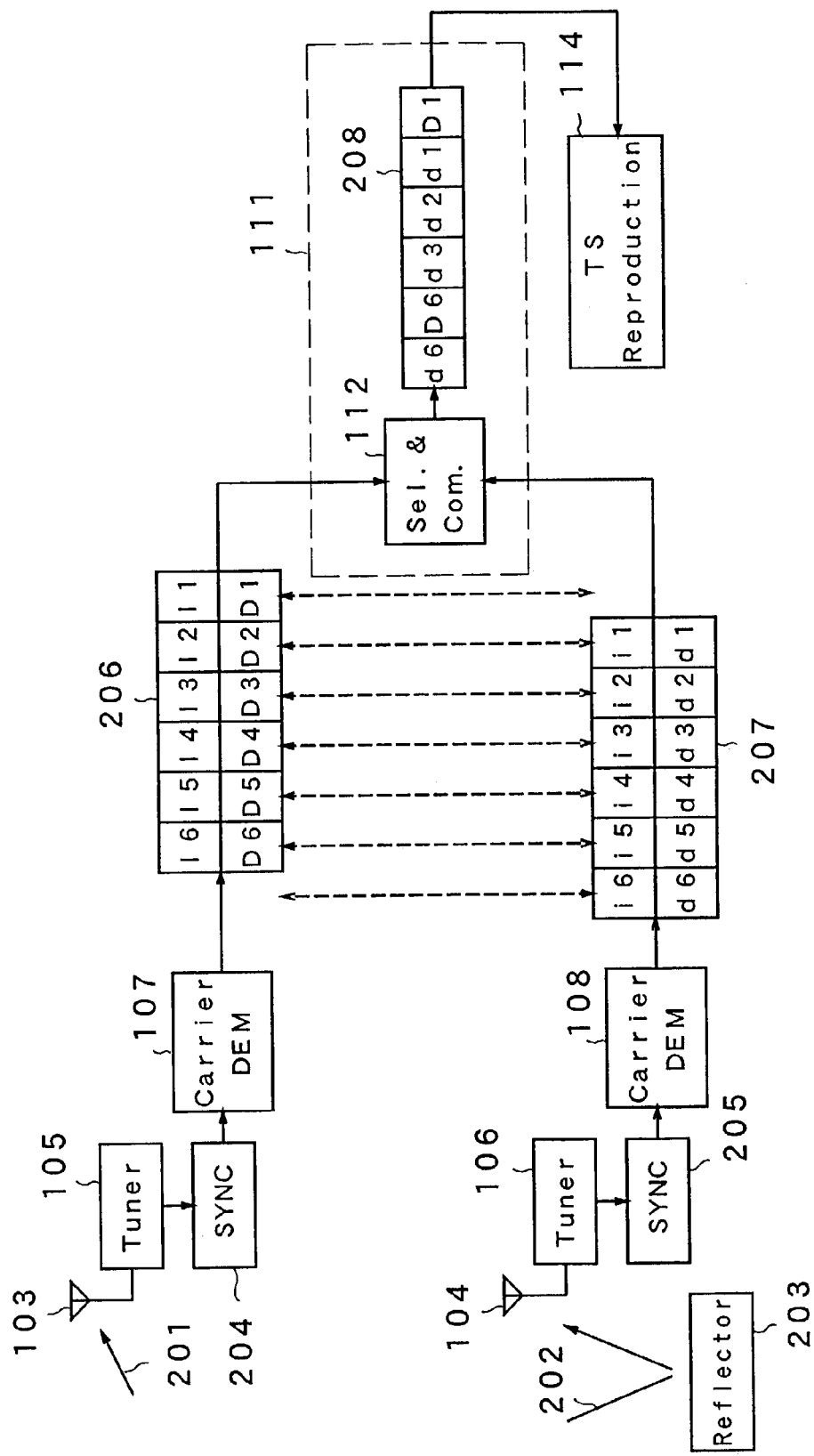
FIG. 2 is a diagram showing the configuration and operational principle of a diversity system in which a synchronous signal detection unit is provided in the case space diversity is implemented for each carrier.

FIG. 2 is a diagram showing the configuration and operational principle of a diversity system for solving the above described problem. The outputs of the tuners 105 and 106 are inputted to synchronous signal position detection units (hereinafter, referred to as SYNC-detection units) 204 and 205. The SYNC-detection unit 204 detects the position of the symbol synchronous signal of the signal received by the antenna 103 series. The SYNC-detection unit 205 detects the position of the symbol synchronous signal of the signal received by the antenna 104 series.

When the received signal deteriorates due to the influences of a reflector 203 or the like under a mobile reception environment, a shift occurs between the positions of the symbol synchronous signals of the two antenna series. The carrier D1 from one antenna series is temporally shifted from the carrier d1 from the other antenna series as shown by data sequences 206 and 207 in FIG. 2. A carrier is selected using reliability value I1 and the like while the correspondence relationship remains shifted when the DIV-operation unit 111 implements the diversity of the above described selection mode under the above condition. The DIV-operation unit 111 thereby selects the carriers D1, d1, d2, d3, D6 and d6 in the order, for example, and there is a possibility in that diversity including errors is implemented as shown by the data sequence 208.

(First Embodiment)

Figure 3:
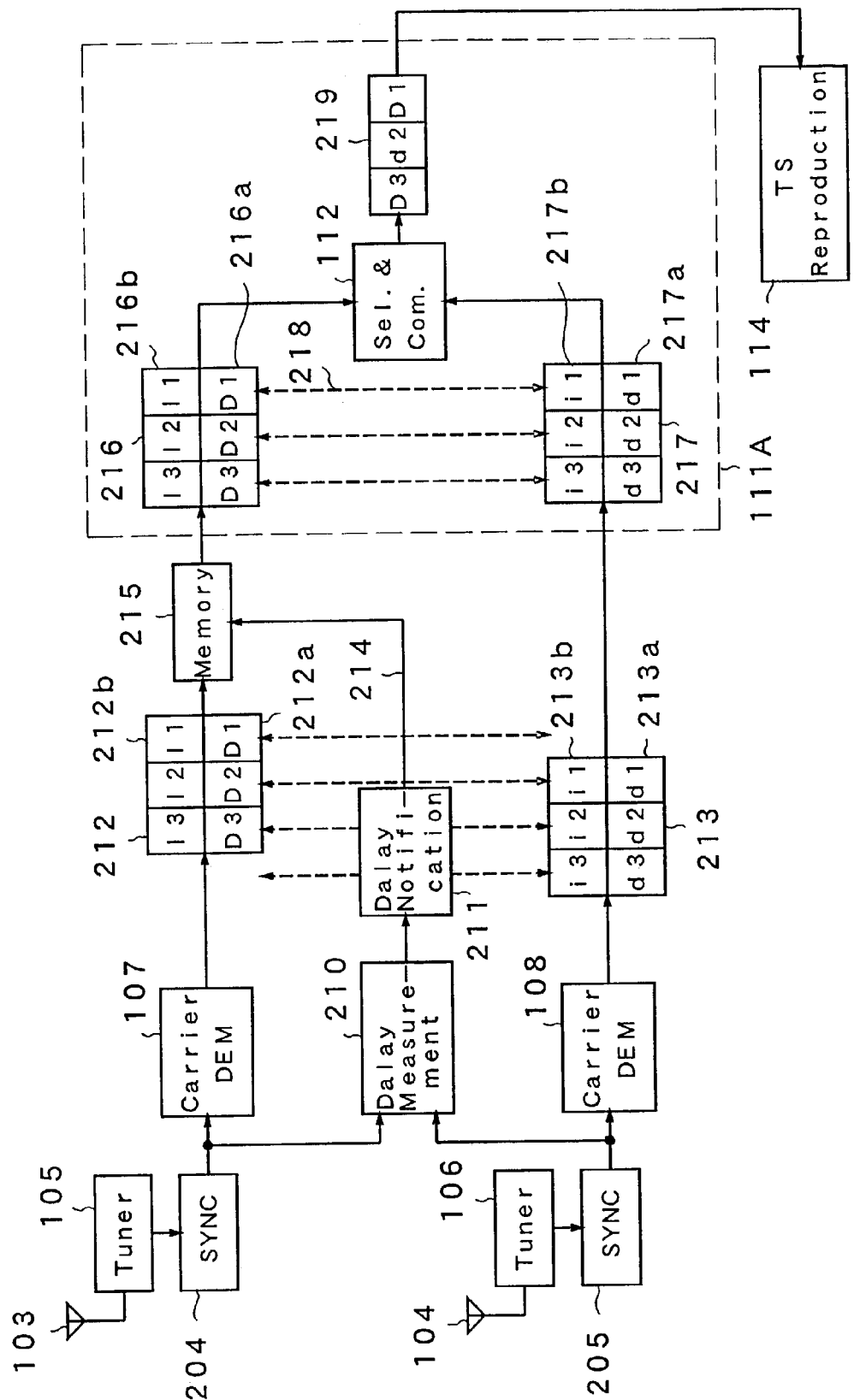
FIG. 3 is a diagram showing the configuration and operational principle of a diversity system according to a first embodiment of the present invention.

The configuration and operational principle of a diversity system according to a first embodiment will be described with reference to FIG. 3. In FIG. 3 the same reference symbols are attached to the same units as in FIGS. 1 and 2; and, descriptions of the same units will not be repeated. The outputs of the tuners 105 and 106 are inputted to the SYNC-detection units 204 and 205, respectively. The SYNC-detection units 204 and 205 detect the positions of the OFDM symbol synchronous signals.

A delay measurement unit 210 measures the amount of relative delay (time difference) between the OFDM signal received via the antenna 103 and the OFDM signal received via the antenna 104. This amount of relative delay can be measured using the time difference between the symbol synchronous signals detected by the SYNC-detection units

204 and 205. In the example shown in FIG. 3, since position detection of the OFDM symbol synchronous signal from the antenna 104 series is delayed; the carrier and reliability value of a data sequence 213 is delayed by one piece of data relative to a data sequence 212.

Herein, a memory unit 215 is provided with the signal processing series of carrier demodulator 107, that is, with the series in which the synchronous signal is detected first. The memory unit 215 has a data recording function and a data read-out function (data transfer function). It is noted that the memory unit 215 can holds the data sequence of either antenna series. Selection of data inputted to the memory unit 215 is carried out on the basis of the output of a delay amount notification unit 211. The memory unit 215 holds the data sequence 212 that has been advanced by one piece of data in the example shown in FIG. 3.

A DIV-operation unit 111A has the selection and combination unit 112. The selection and combination unit 112 reads out data from the memory unit 215 so as to align the positions of both carriers. This positioning of the carriers can be implemented on the basis of a delay amount notice 214 from the delay amount notification unit 211 by holding data in the memory unit 215 for the period of time of this delay.

A broken lines 218 in the figure show the condition that the pieces of data are aligned. Thus, the DIV-operation unit 111A implements diversity using the corresponding data. Though an example of a selection diversity mode is described above, combination diversity according to weighted combination can be carried out on the respective carriers in accordance with the reliability by using the pieces of data that have been aligned with each other in the same manner as in the case of the selection diversity mode.

A diversity system having such configuration allows demodulation of the carriers in the case where the reception by at least one antenna series is good. Thus, the diversity system can implement space diversity for each carrier even in the case the positions of the symbol synchronous signals of the respective antenna series are shifted from each other.

(Second Embodiment)

Figure 4:
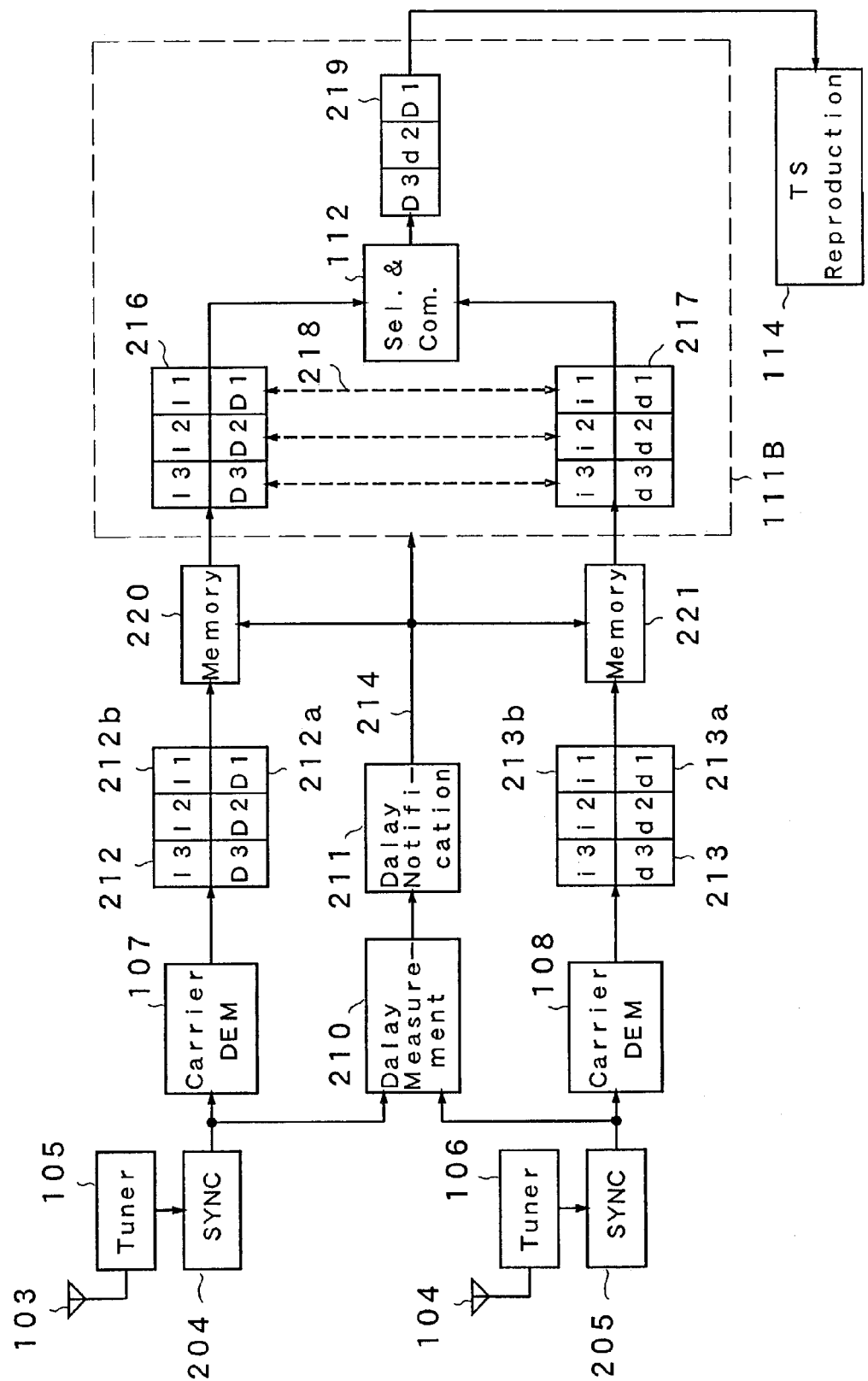
FIG. 4 is a diagram showing the configuration and operational principle of a diversity system according to a second embodiment (unit 1) of the present invention.

Next, a diversity system and operational principle thereof according to a second embodiment of the present invention will be described with reference to FIG. 4. In the first embodiment, the description has been given of the solving method in the case it has been proved in advance that one antenna series are delayed relative to the other antenna series when the diversity system has the two antenna series. However, the positions of the symbol synchronous signals temporally vary in many cases. The position of the symbol synchronous signal from one antenna series is early in some cases and the position of the symbol synchronous signal from the other antenna series is early in other cases.

The outputs of the carrier demodulators 107 and 108 are inputted to memory units 220 and 221, respectively, in the second embodiment. The memory units 220 and 221 have the same function. Each memory unit has a data recording function and a data recording function (data transfer function).

The delay measurement unit 210 measures the amount of relative delay between the antenna series by means of position detection of the symbol synchronous signals using the SYNC-detection units 204 and 205.

A carrier 212a and a reliability value 212b, which have been demodulated by the antenna 103 series, are later than those from the antenna 104 series in the case the arrival of the symbol synchronous signal from the antenna 103 series is late in comparison with the antenna 104 series. In this case, a DIV-operation unit 111B reads out a carrier 213a and a reliability value 213b of the antenna 104 series from the memory unit 221 after a given period of time. In addition, the DIV-operation unit 111B immediately reads out the carrier 212a and reliability value 212b of the antenna 103 series from the memory unit 220. Thus, the DIV-operation unit 111B aligns the data positions of the carrier and the reliability value of the antenna 104 series at the data positions of the carrier and the reliability value of the antenna 103 series when the selection and combination unit 112 carries out comparison and selection. Such an alignment of data positions can be implemented by controlling the read-out timing from the respective memory units.

Figure 5:
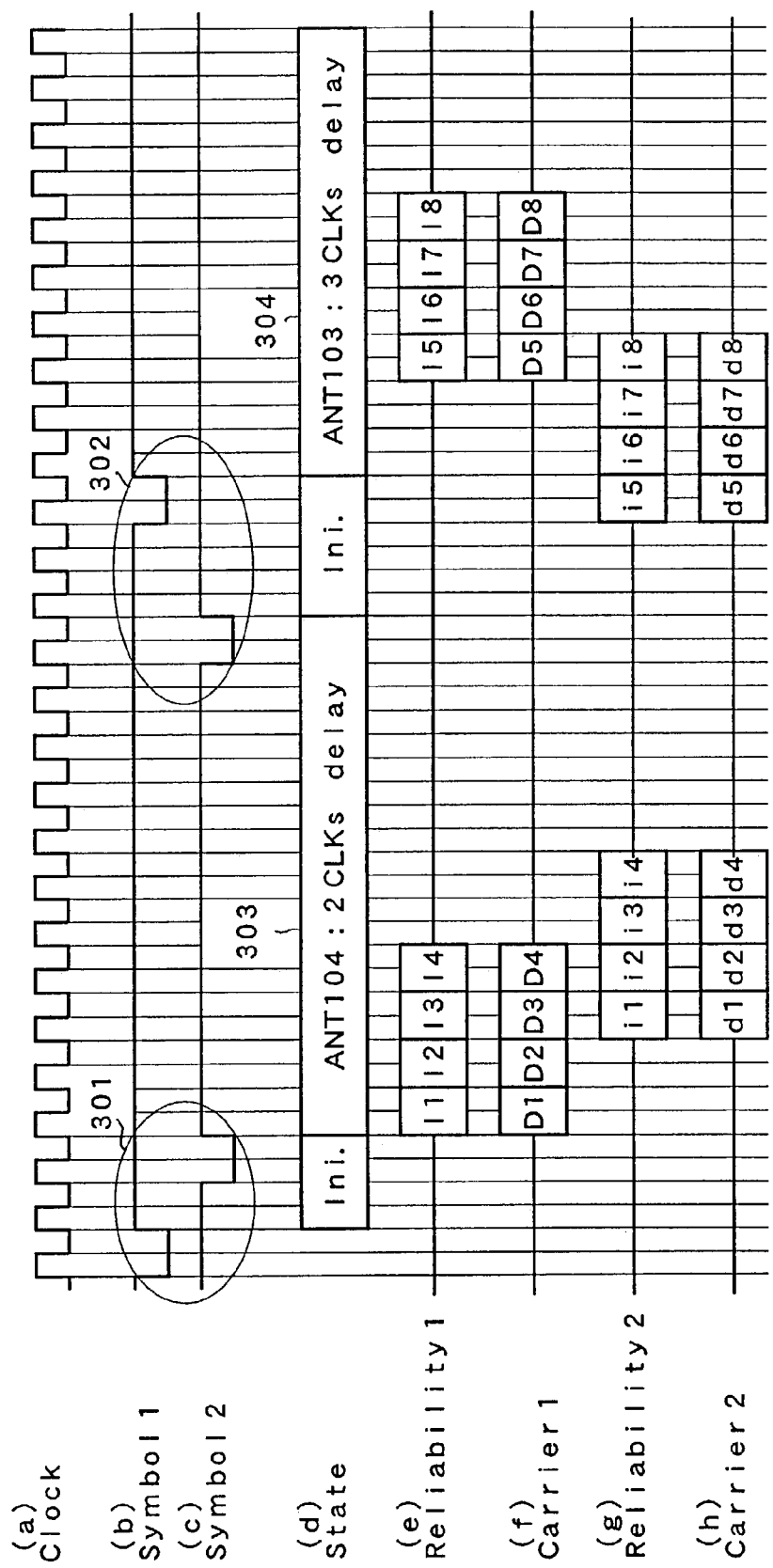
FIG. 5 is a timing chart (unit 1) showing the operation of the diversity system according to the second embodiment.
Figure 6:
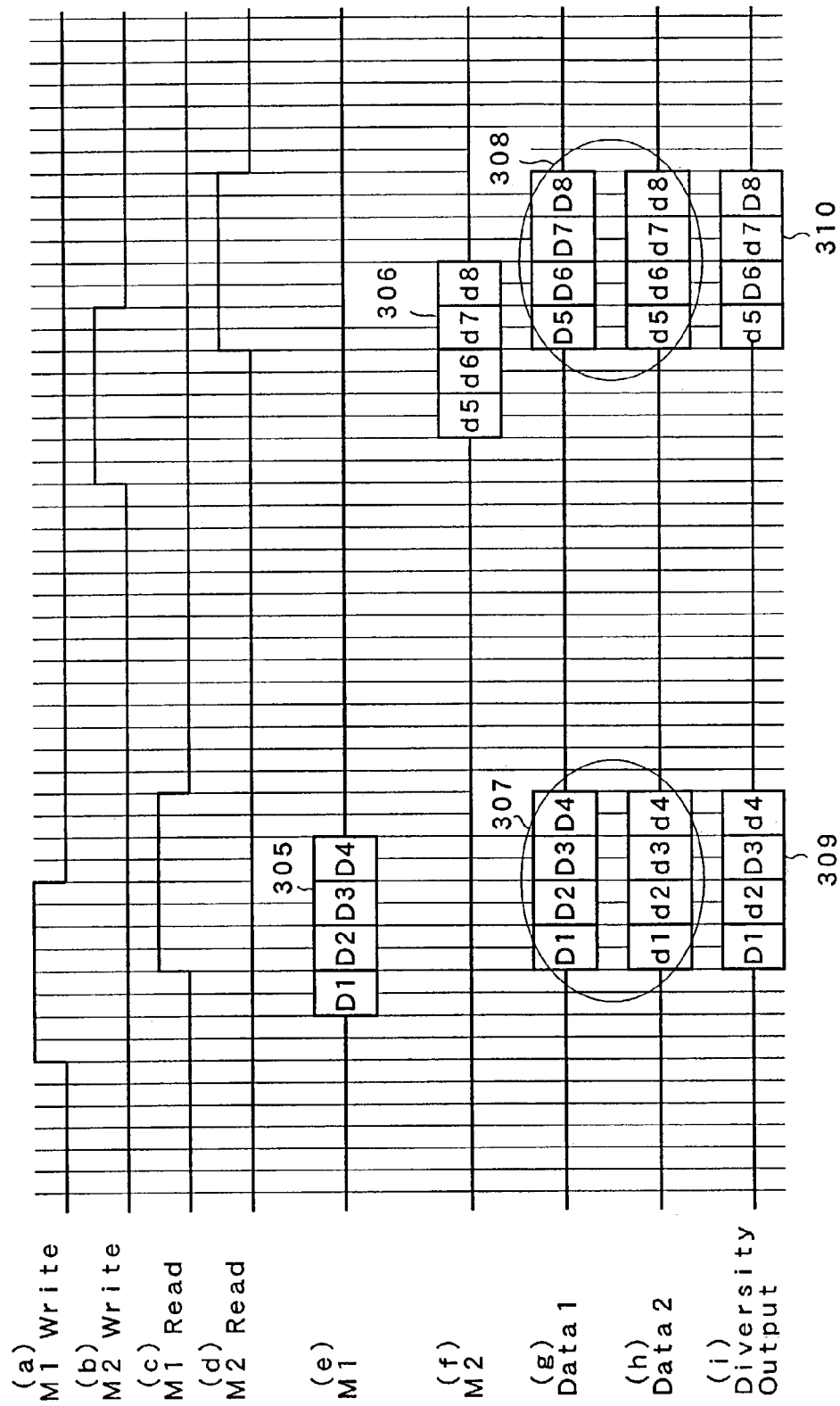
FIG. 6 is a timing chart (unit 2) showing the operation of the diversity system according to the second embodiment.

The specific operation of the diversity system according to the second embodiment will be described with reference to the timing charts of FIGS. 5 and 6. FIGS. 5 and 6 indicate the operation of diversity in a selection mode and show the condition that diversity is implemented by making adjustment for the resultant delays in accordance with one OFDM symbol unit with respect to fluctuation in the positions of symbol synchronous signals between the antenna series.

The clock in FIG. 5 (*a*) is a reference clock for implementing signal processing in the diversity system. A symbol synchronous signal 1 in FIG. 5 (*b*) is a symbol synchronous signal according to OFDM in one antenna series (antenna series 103) that has been detected. A symbol synchronous signal 2 in FIG. 5 (*c*) is a symbol synchronous signal according to OFDM in the other antenna series (antenna series 104) that has been detected. A state in FIG. 5 (*d*) is a diagram showing a relative delay of symbol synchronous signals of the antenna series. In the first half of this chart the signal of the antenna 104 series is delayed by two clocks in comparison with the signal of the antenna 103 series while in the second half the signal of the antenna 103 series is delayed by three clocks in comparison with the signal of the antenna 104 series. This state shifts to the next state after the SYNC-detection unit is once initialized by any of the symbol synchronous signals subsequently detected and again both the symbol synchronous signals are detected.

As shown in FIGS. 5 (*e*) and (*f*), the reliability value 1 and demodulated carrier 1 obtained from the antenna 103 series make respective pairs, wherein I1 of the reliability value 1 indicates reliability of the demodulated carrier D1. As shown in FIGS. 5 (*g*) and (*h*), the reliability values 2 obtained from the antenna 104 series make pairs with the demodulated carriers 2.

The memory 1 write signals and the memory 2 write signals shown in FIGS. 6 (*a*) and (*b*), are write enable signals corresponding to the memory units 220 and 221 belonging to the respective antenna series. These write enable signals are produced when the demodulation carriers of the antenna series on the side to which the signal has first arrived are written into the memory unit. It is not necessary to write the demodulation carriers of the opposite series into the memory unit and, thereby, write enable signals are not produced.

The memory 1 read signals and the memory 2 read signals, shown in FIGS. 6 (*c*) and (*d*), are read enable signals for the same memory units 220 and 221. These read enable signals are produced when the demodulation carriers that have been written into the memory unit in advance are read out. The memory 1 carriers and memory 2 carriers, shown in FIGS. 6 (*e*) and (*f*), are carriers that have been written into memory units 220 and 221, respectively. The data 1 carriers and data 2 carriers, shown in FIGS. 6 (*g*) and (*h*), are carriers resulting after timing adjustment has been carried out by the memory units 220 and 221. These carriers are compared and a diversity operation is implemented through processing, such as by selection, by weighted combination or the like.

The selection and combination unit 112 outputs carriers after selection, as shown in FIG. 6 (*i*).

Next, the operation of the diversity system is described in accordance with the numbers attached to the timing charts of FIGS. 5 and 6. The numeral 301 in FIG. 5 shows the condition that an initial symbol synchronous signal has arrived. In this case, the position of the symbol synchronous signal is detected by the antenna 103 series two clocks earlier than by the antenna 104 series, and the state 303 shown in FIG. 5 (*d*) occurs. The carrier demodulated from the antenna 103 series arrives two clocks earlier than from the antenna 104 series. At this time, the memory unit 220 holds these carriers. Then, as shown by 305 of FIG. 6, the memory unit 220 reads out these carriers two clocks later and adjusts the demodulation carrier of the antenna 104 series for timing. This is the condition shown by 307 of FIG. 6. The carriers of the respective series are aligned when diversity is implemented so that precise carrier diversity can be implemented in the case the carrier of the antenna 103 series arrives before the carrier of the antenna 104 series causing a relative delay, as described above.

In the next OFDM symbol, the carrier of the antenna 103 series is delayed by three clocks with reference to the carrier of the antenna 104 series, as shown by 302 of FIG. 5. At this time, the state of the previous symbol is cleared, and the state shown by 304 occurs. In the case of this state, the demodulated carrier of the antenna 104 series temporally advances; thereby, the memory unit 221 holds the demodulated carrier of the antenna 104 series. This is the condition shown by 306 of FIG. 6. The demodulated carrier of the antenna 103 series is relatively delayed by three clocks; thereby, the memory unit 221 starts read-out three clocks later. Then, as shown by 308 of FIG. 6, the DIV-operation unit implements diversity in the state where the carriers of both antenna series are aligned with each other. The implementation result of the diversity in this case is shown by 310.

On the other hand, timing for position detection of the symbol synchronous signal may be simultaneous. In this case, a relative delay does not occur and the timings of the carriers that have been demodulated by the respective antenna series are aligned. At this time, the above described adjustment of timing is unnecessary and the DIV-operation unit 111B carries out a diversity operation without time shift.

Figure 7:
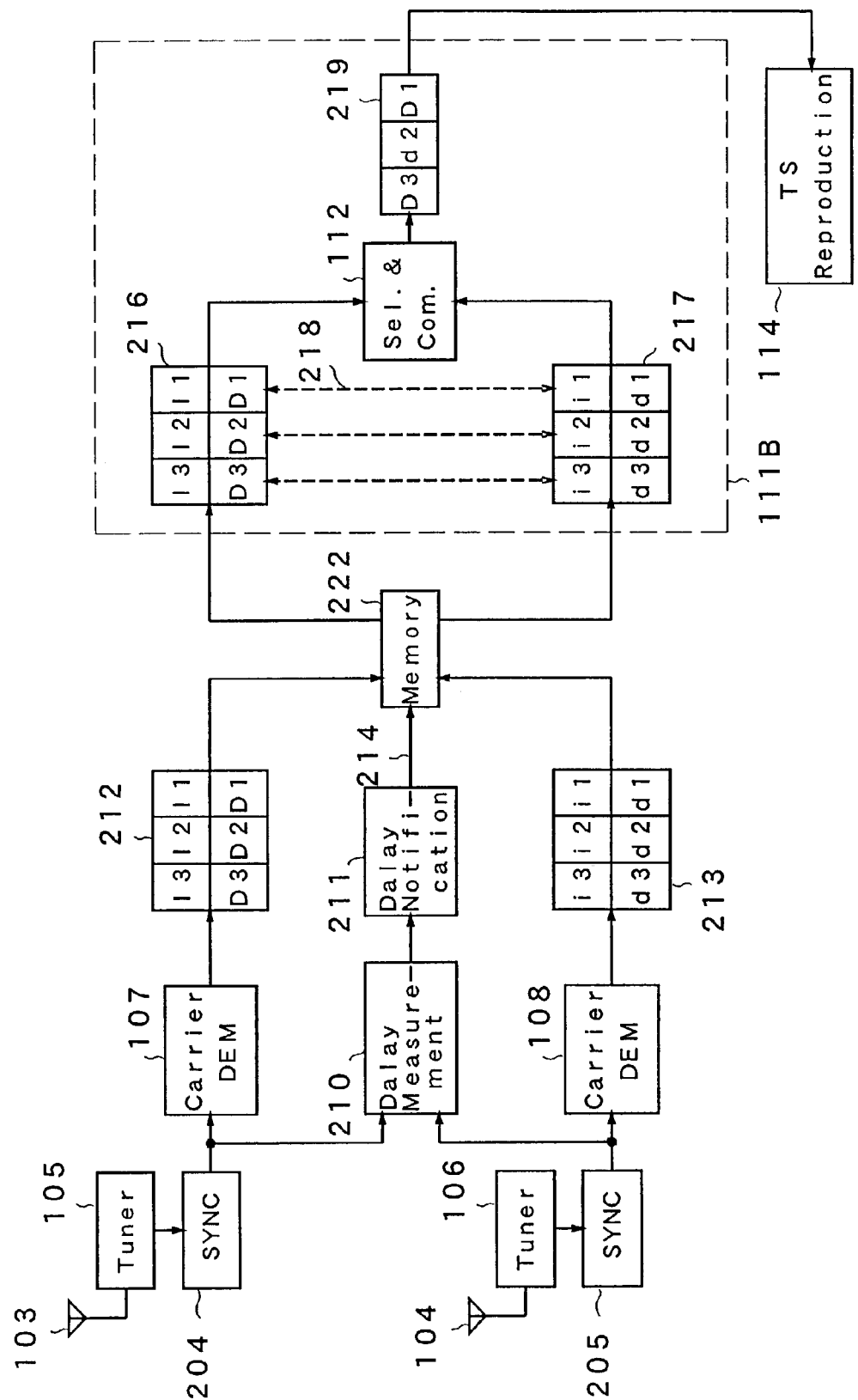
FIG. 7 is a diagram showing the configuration and operational principle of a diversity system according to the second embodiment (unit 2) of the present invention.

In the above description, the memory units are provided for each antenna series. As shown in FIG. 7, however, it is possible to reduce the number of memory units by sharing one memory unit in accordance with the position detection of the symbol synchronous signal according to OFDM. A memory unit 222 is shared by the two antenna series, and a delay process is carried out by this memory unit 222, as shown in FIG. 7.

In the case the symbol synchronous signal according to OFDM of the antenna 103 series is detected first, the memory unit 222 holds the carrier 212*a* and reliability value 212*b* demodulated by the antenna 103 series. In a case contrary to this, the memory unit 222 holds the carrier 213*a* and reliability value 213*b* demodulated by the antenna 104 series. By using such a mode, the circuit can be scaled down and diversity can be implemented wherein the timing of the carriers are aligned among the antenna series.

As described above, the optimal state is generated according to one OFDM symbol unit while the symbol synchronous signal is detected in real time in the case a temporal shift occurs among carriers of the respective antenna series in position detection of the symbol synchronous signal.

Then, the diversity operation is carried out by aligning the carriers included in the respective OFDM symbols for the respective antenna series.

As described above, according to the present embodiment, the delay gap of the symbol synchronization among unrelated antenna series caused according to one OFDM symbol unit can be reduced, so that the reception characteristics by carrier diversity can be further improved.

(Third Embodiment)

Next, a diversity system and the operational principle thereof according to a third embodiment of the present invention are described. The diversity systems of the first and second embodiments implement diversity by making adjustment for the relative delay of the respective antenna series. However, the delay gap in position detection of the symbol synchronous signal of the respective antenna series becomes very great when reception conditions deteriorate. In the diversity systems of the above described mode, memory units having extremely large capacities become necessary in order to completely eliminate the delay gap and the circuit must be scaled up.

Then, the diversity system of the present embodiment outputs a demodulated carrier of which the position detection of the symbol synchronous signal is earlier without any changes in the case a relative delay having not less than a predetermined value occurs. Thereby, operational failure of the diversity system can be avoided and the scaling up of the circuit can be suppressed.

Figure 8:
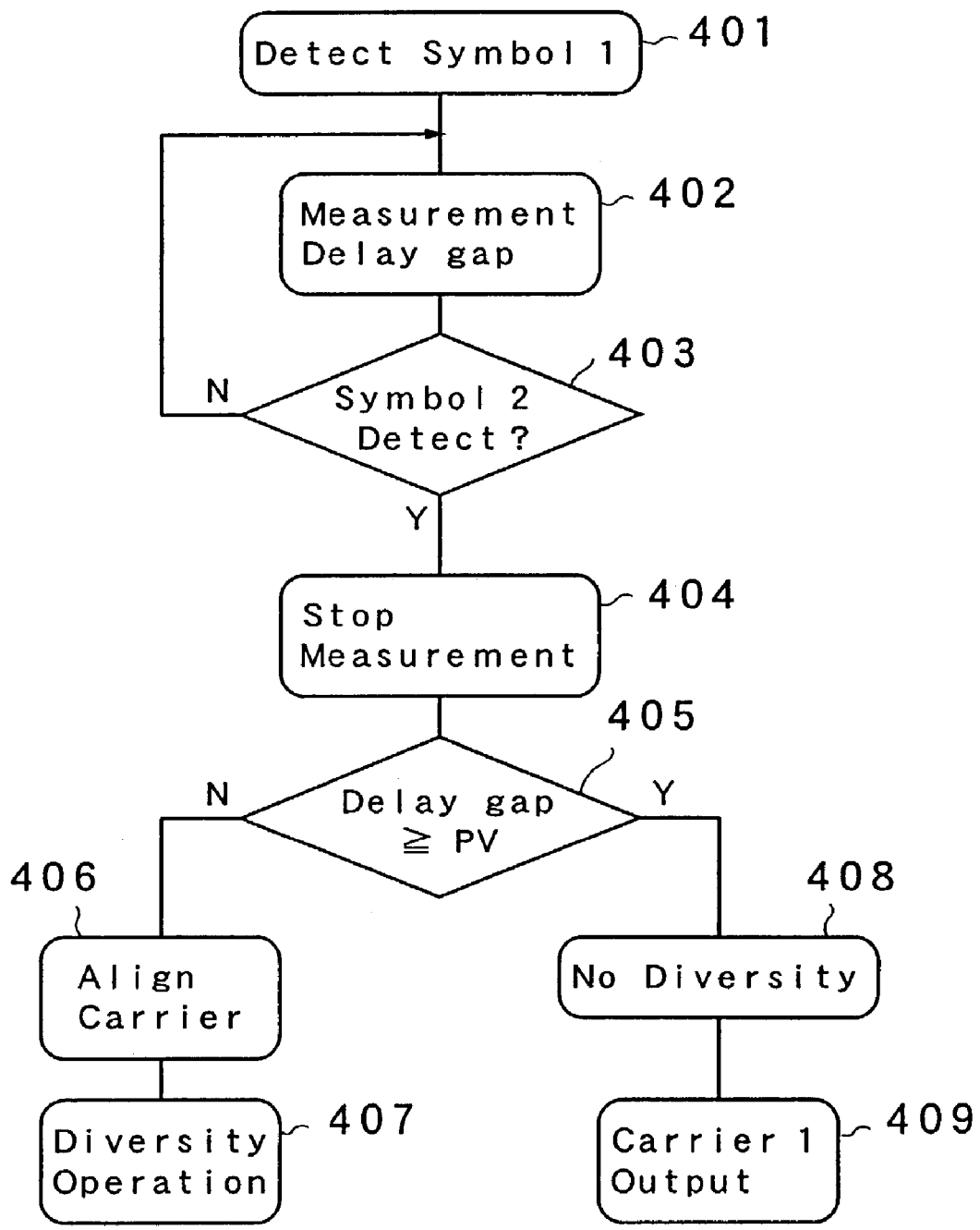
FIG. 8 is a flow chart showing the operation (unit 1) of a space diversity mode for each carrier according to a third embodiment of the present invention.

The operation of the diversity system according to the present embodiment will be described using the flow charts of FIGS. 8 and 9. It is assumed that two antenna series are used for reception in order to simplify the description. FIG. 8 is a flow chart showing signal processing in the case where the detection of a symbol synchronous signal of the antenna series 103 is earlier than that of the antenna 104 series. Contrarily, FIG. 9 is a flow chart showing signal processing in the case the detection of a symbol synchronous signal of the antenna 104 series is earlier than that of the antenna 103 series.

When the antenna 103 series is the first to detect the symbol synchronous signal (symbol 1) as shown in step 401 of FIG. 8, measurement of the relative delay gap is started in step 402. This delay gap can be obtained by measuring the relative time gap. When the symbol synchronous signal (symbol 2) of the antenna 104 series is detected as shown in step 403, the procedure proceeds to step 404 so as to stop measurement. Next, the procedure proceeds to step 405 and it is determined whether or not the delay gap at this time is of a predetermined value PV or greater. The procedure proceeds to the processes of steps 406 and 407 in the case the delay gap is less than the predetermined value and the DIV-operation unit implements diversity by aligning the timing of the carriers of both antenna series as described in the second embodiment.

The procedure proceeds to step 408 and no diversity is implemented in the case the delay gap is not less than the predetermined value PV in step 405. In this case, the procedure proceeds to step 409 and the DIV-operation unit outputs the carrier 1 of the antenna 103 series without any changes. According to such processing mode, the DIV-operation unit can continue outputting the necessary data without operational failure in a condition that scaling up of the circuit is suppressed even when the arrival of the signal of one antenna series has been greatly delayed due to deterioration of the transmission path.

Figure 9:
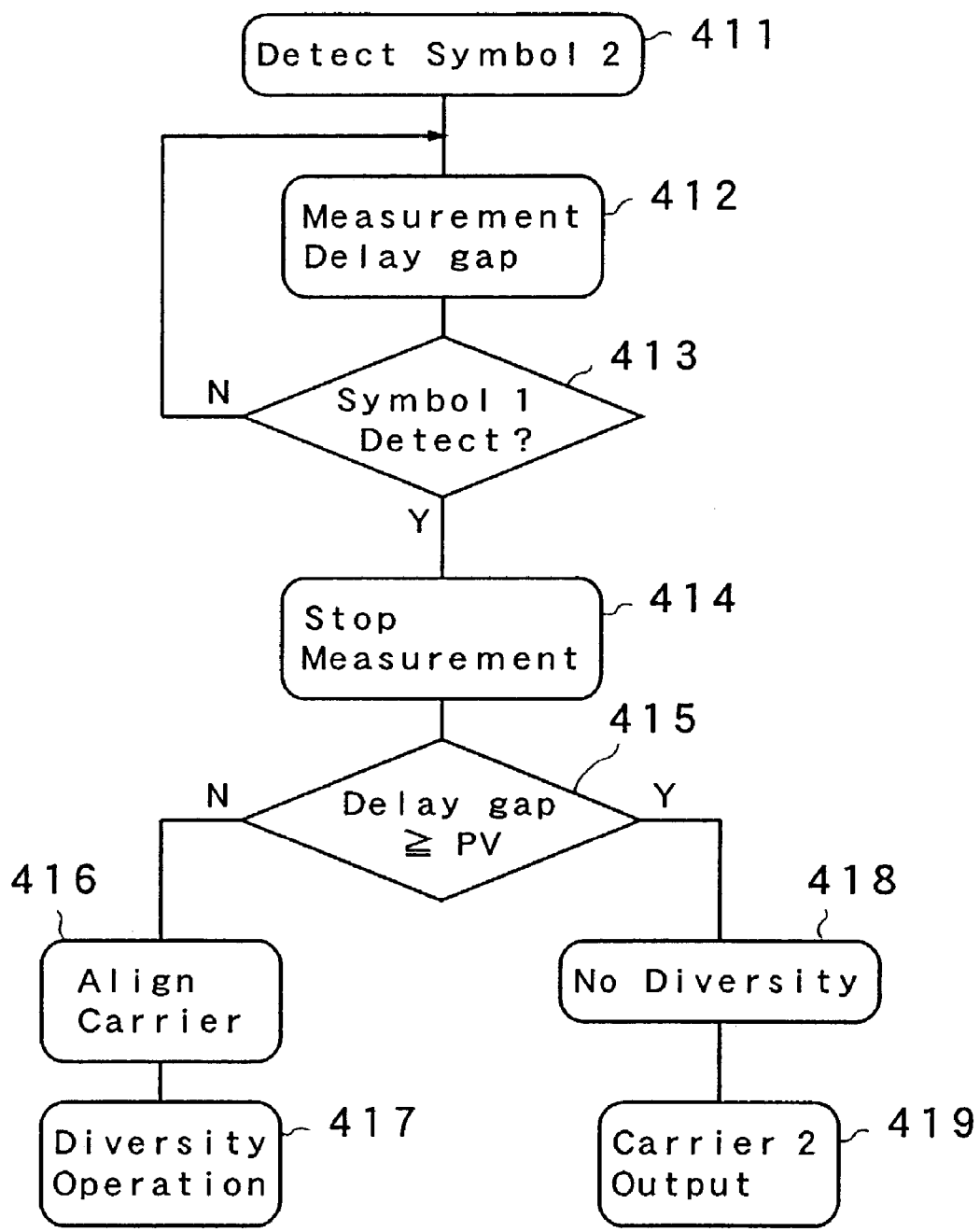
FIG. 9 is a flow chart showing the operation (unit 2) of the space diversity mode for each carrier according to the third embodiment.

FIG. 9 is a flow chart of the case where position detection of the synchronous signal of the symbol 2 is carried out. This flow chart is obtained by replacing the processes of steps 402 to 408 of FIG. 8 with the processes of steps 412 to 418; and, the contents of the processes are the same as shown in FIG. 8. Herein, the carrier 2 is outputted without any changes in step 419 and operational failure of the diversity system can be avoided.

As described above, the output of carriers is continued, thereby avoiding failure of OFDM demodulation according to the present embodiment even when the condition occurs where the diversity operation cannot be carried out by making the carriers of a plurality of antenna series correspond to each other.

(Fourth Embodiment)

Figure 10:
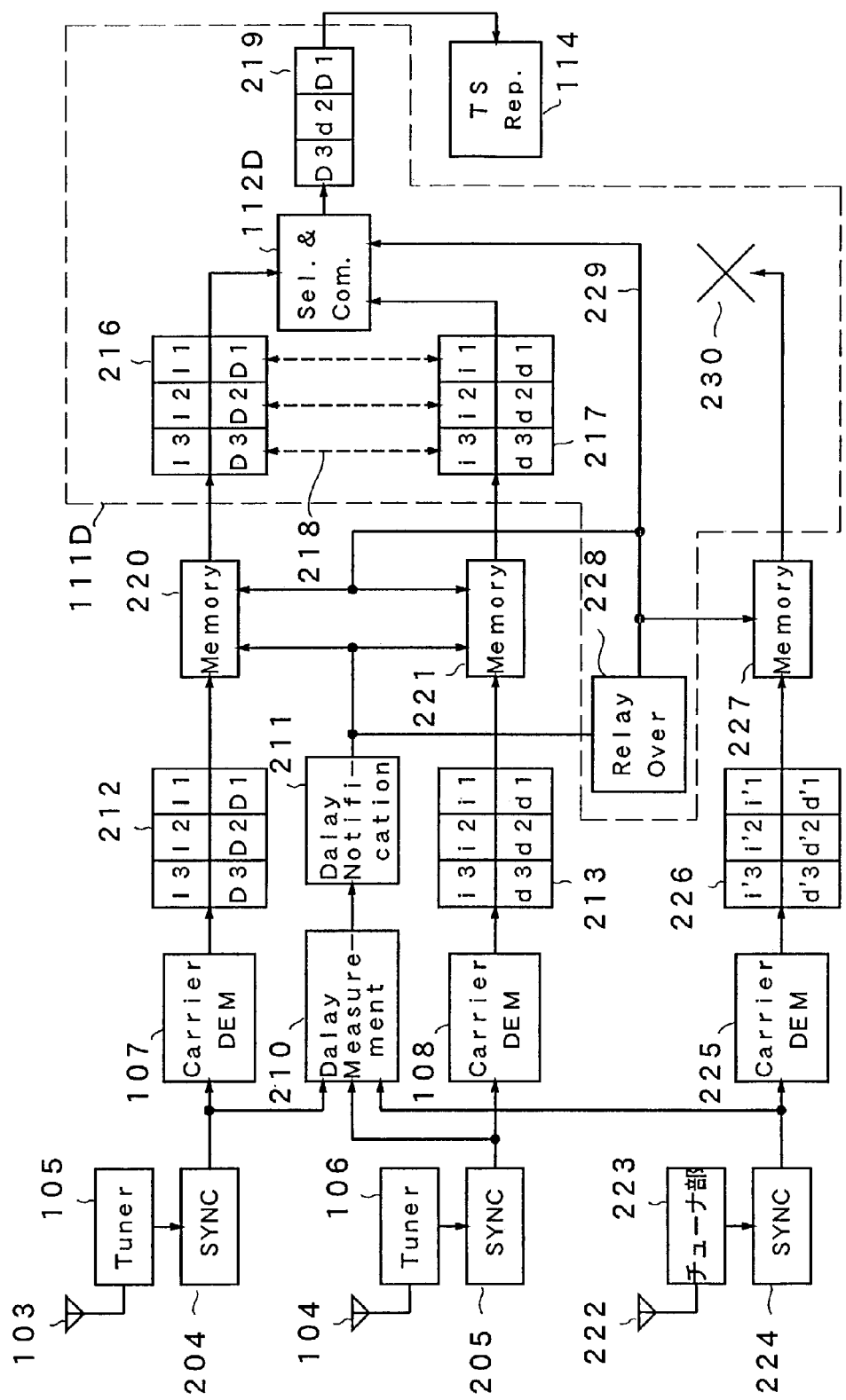
FIG. 10 is a diagram showing the configuration and operational principle of a diversity system according to a fourth embodiment of the present invention.

Next, a diversity system and the operational principle thereof according to a fourth embodiment of the present invention will be described. Processes are carried out by the diversity system of the fourth embodiment where three or more antenna series exist, as shown in FIG. 10. Herein, the number of antenna series is three for convenience of description.

The diversity system of the present embodiment has a antenna 222 of a third antenna series in addition to the antenna 103 of the first antenna series and the antenna 104 of the second antenna series. This diversity system has, as components of the antenna 222 of the third antenna series, a tuner 223, a SYNC-detection unit 224, a carrier demodulator 225 and a memory unit 227, which are the same as in the other antenna series. With such a configuration, a symbol synchronous signal is detected from the OFDM signal received by the antenna 222 of the third series. The respective symbol synchronous signals detected by the SYNC-detection units 204, 205 and 224 are inputted into the delay measurement unit 210. The delay measurement unit 210 measures the amount of relative delay of the symbol synchronous signal in the respective antenna series. A DIV-operation unit 111D has a delay over notification unit 228 and a selection and combination unit 112D.

FIG. 10 shows a case where the amount of delay of the signal received by the antenna 222 series exceeds the amount of delay that can be dealt with by the memory unit 220 or memory unit 221. The delay amount notification unit 211 notifies the memory units 220, 221 and 227 of the amounts of the relative delays of the signals received by the respective antenna series. In the case a delay of not less than a predetermined value occurs, the delay over notification unit 228 notifies the memory unit 227 and the selection and combination unit 112D of information concerning the delay. Though a data sequence 226 is inputted to the memory unit 227, the data sequence 226 is not transferred to the selection and combination unit 112D. The selection and combination unit 112D implements diversity through selection and combination solely by using carriers processed by antennas other than the antenna 222.

The above-described operation is an example where the number of antenna series is three, a predetermined delay time is exceeded in one series, so that the remaining two antenna series are used for implementing diversity. As shown in a symbol 230 of FIG. 10, when the reception by the antenna 222 series exceeds the delay time of a predetermined value, data sequences demodulated by the antenna 222 series are not used. However, in some cases, of course, the signals of all of the antenna series have delay times that are no greater than the predetermined delay time.

The data held in the memory unit 227 is utilized on the basis of the amount of relative delay received from the delay amount notification unit 211 in the case the relative delays of every signals received by the antenna 222 series and by the other antenna series have delay times less than the predetermined value. That is, the DIV-operation unit 111D inputs the carriers and reliability values of the data sequences 226 into the selection and combination unit 112D and implements diversity for carriers demodulated by all of the antenna series.

In this case, the DIV-operation unit 111D compares reliability values I1, i1, i'1, respectively, for example, and selects any piece of data D1, d1 or d'1 and implements weighted combination. Thus, the effects of diversity can be further improved.

With the above-described configuration and operation, the diversity system of the present embodiment can further increase the effects of space diversity for each of the carriers using the carriers demodulated by all of the antenna series in the case three or more antenna series are provided. In addition, in the case an amount of delay of any of the antenna series becomes or more than the predetermined value, the diversity system of the present embodiment does not use the carrier of this antenna series but, rather, uses the carriers of the other antenna series to implement diversity.

As described above, the effects of diversity can be obtained according to the present embodiment even in the case the detection of the position of the symbol synchronous signal solely of an arbitrary antenna series is greatly delayed due to change in conditions of the transmission path.

(Fifth Embodiment)

Next, a diversity system and diversity method according to a fifth embodiment of the present invention will be described with reference to FIG. 11. The configuration of the diversity system of the present embodiment is the same as that shown in FIG. 10. The reception level at an arbitrary antenna series is lowered, so that reception of an OFDM signal becomes difficult due to deterioration of the condition of the transmission path, and a symbol synchronous signal according to OFDM cannot be detected in a system using OFDM demodulation having a plurality of antenna series.

In this case, also, the delay measurement unit measures the period of time from the position of the symbol synchronous signal according to OFDM that has arrived first to the position of the symbol synchronous signal at another antenna series. Reception is determined to have failed in the case the amount of delay has exceeded a predetermined value as a result of the delay measurement in antenna series that do not detect a symbol synchronous signal.

Figure 11:
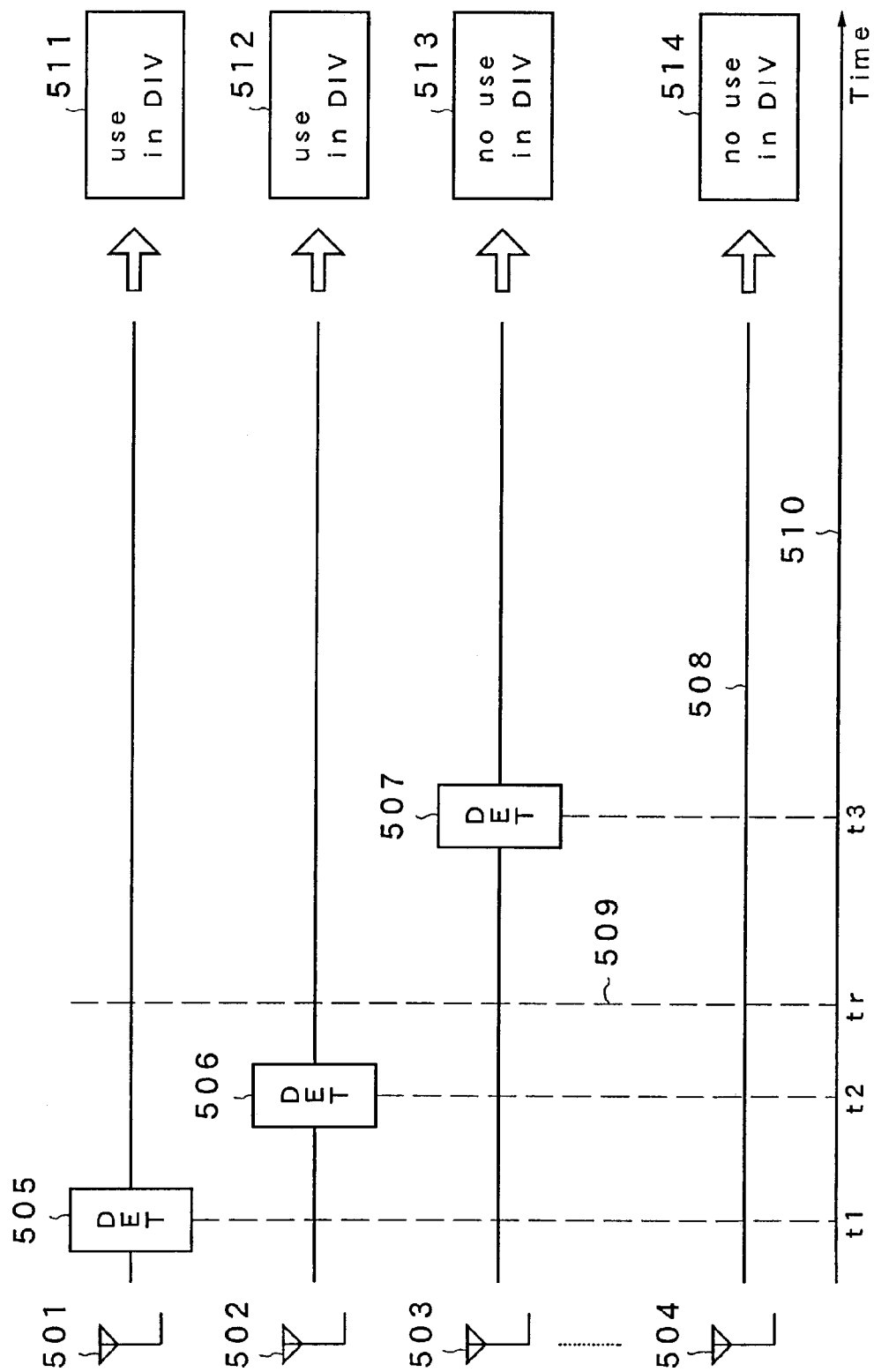
FIG. 11 is a schematic diagram showing the operation of a diversity system according to a fifth embodiment of the present invention.

FIG. 11 shows a representation of the symbol synchronous signal along the time axis being detected from the OFDM signal received by each of the antenna series in a system having a plurality of antenna series. A solid line 510 represents the time axis.

It is assumed that signal processing circuits for an antenna 501 series to an antenna 504 series, respectively, are provided in the diversity system. The SYNC-detection unit of each of the antenna series starts detection of a symbol synchronous signal according to OFDM. A synchronous detection 505 shown in the figure indicates that the symbol synchronous signal according to OFDM of the antenna 501 series has been detected at time t1. A synchronous detection 506 indicates that the symbol synchronous signal according to OFDM of the antenna 502 series has been detected at time t2 (t2>t1). Further, a synchronous detection 507 indicates that the symbol synchronous signal according to OFDM of an antenna 503 series has been detected at time t3, which is delayed with reference to delay a reference time tr (broken line 509). The delay reference time tr indicates the time that becomes the limit of the amount of delay and is the time that marks the tolerance in the case the diversity operation is implemented by aligning the carriers of the OFDM symbols that are relatively delayed.

A solid line 508 indicates the condition that reception by an antenna 504 series has failed and detection of a symbol synchronous signal becomes impossible. Accordingly, synchronous detections 505 and 506 indicate that the positions of the symbol synchronous signals have been detected prior to the time that marks the tolerance. In this case, the DIV-operation unit 111D employs the carriers in these symbols for the diversity operation, as shown by 511 and 512.

In contrast to this, since the synchronous detection 507 indicates that the symbol synchronous signal has been detected subsequent to the reference time tr, the DIV-operation unit 111D does not employ this symbol for the diversity operation as shown by 513. Moreover, as shown by solid line 508, the demodulation itself of the carrier becomes impossible in the case a symbol synchronous signal according to OFDM cannot be detected due to failure. In this case, also, the DIV-operation unit 111D does not implement the diversity operation, as is the case for the carriers of the antenna 503 series as shown by 514.

As described above, the diversity system of the present embodiment determines the failed antenna series on the basis of the amount of relative delay of the symbol synchronous signals between the antenna series and excludes the failed antenna series from the diversity operation. In addition, where all of the antenna series other than one antenna series have failed, the diversity system of the present embodiment outputs only the carrier of the series that has not failed to the TS reproduction unit. In particular, though all of the demodulations fail due to the failure of reception by the master in the mode wherein an arbitrary antenna series is used as the master while the remaining antenna series are used as slaves as in the related art, the diversity system of the present embodiment can avoid such a problem.

(Sixth Embodiment)

Figure 12:
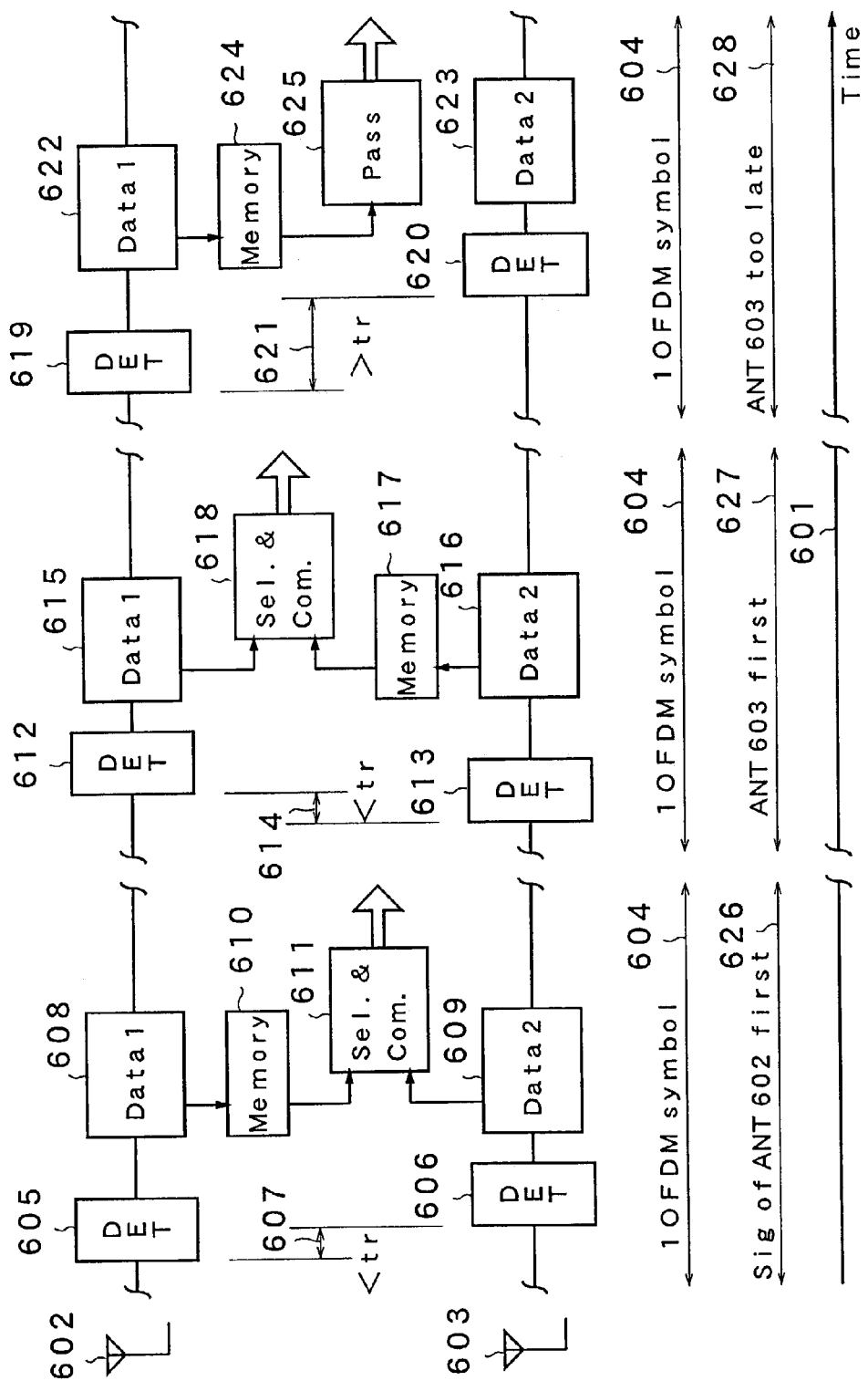
FIG. 12 is a schematic diagram showing the operation of a diversity system according to a sixth embodiment of the present invention.

Next, a diversity system and diversity method according to a sixth embodiment of the present invention will be described with reference to FIG. 12. The configuration of the diversity system of the present embodiment is the same as that shown in FIG. 10. As shown in FIG. 12, it is assumed herein that two antenna series are provided for the purpose of description, and methods for implementation of diversity in OFDM demodulation in accordance with change in reception conditions are shown along the time axis.

A solid line 601 of FIG. 12 shows the time axis. An antenna 602 is of a first antenna series and an antenna 603 is of a second antenna series. The operational conditions change as a result of reception by the respective antenna series in one OFDM symbol unit in accordance with the condition of the symbol synchronous signal as shown by an arrow mark 604.

A synchronous detection 605 indicates that the first OFDM symbol synchronous signal has been detected by the antenna 602 series as shown in a timing 626. Next, a synchronous detection 606 indicates that the symbol synchronous signal according to OFDM of the antenna 603 series has been detected. In this case, a relative delay gap 607 between the two signals is within the reference time. As described in the first and second embodiments, a memory 610 holds a carrier data 608 of the antenna 602 series. Thus, the diversity system aligns the data positions of the carrier data 608 and of a carrier data 609 and implements the diversity operation by means of a selection combination 611.

As for the second OFDM symbol, the OFDM symbol synchronous signal of the antenna 603 series arrives before the OFDM symbol synchronous signal of the antenna 602 according to a timing 627 of the operation shown in the center portion of FIG. 12. Herein, the delay gap 614 thereof is within the reference time. Therefore, a memory 617 holds a carrier data 616 of the antenna 603 series in this OFDM symbol period. Thus, the diversity system aligns a carrier data 615 of the antenna 602 series and a carrier data 616 of the antenna 603 series. Then, diversity operations such as selection or combination are carried out by means of a selection combination 618. Thus, the diversity system implements carrier diversity by aligning both carriers even under the condition opposite to that of the directly preceding OFDM symbol.

As for the third OFDM symbol, the OFDM symbol synchronous signal of the antenna 602 series arrives before the OFDM symbol synchronous signal of the antenna 603 according to a timing 628 of the operation shown on the right side of FIG. 12. Furthermore, a delay gap 621 exceeds the reference time. In this case, the diversity system does not implement the diversity operation on a carrier data 622 of the antenna 602 series but, rather, outputs the carrier of a memory unit 624 without any changes as shown by 625. That is, the diversity system outputs the carrier of the antenna 602 series without any changes, whereby complete failure can be avoided even in the case the signal of the antenna 603 series is delayed to a great extent in a specific OFDM symbol period.

As described above, the diversity system of the present embodiment can implement diversity for each carrier by switching the operation in the OFDM symbol unit even in the case the timing of detection of the OFDM symbol synchronous signal of the antenna series has changed due to change in the reception environment.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-141565 filed on May 16, 2002 is hereby incorporated by reference.

What is claimed is:

1. A diversity system for implementing space diversity for each carrier in an OFDM signal demodulation system having a plurality of antennas, comprising:

symbol synchronous signal position detection units which are provided for the respective antenna series, and which detect symbol synchronous signals of OFDM symbols;

carrier demodulators which are provided for the respective antenna series, and which demodulate carriers of OFDM, and calculate reliability of each of said carriers;

a delay measurement unit which measures the amount of relative delay between the antenna series on the basis of said symbol synchronous signals of said antenna series;

a delay amount notification unit which outputs the amount of relative delay obtained by said delay measurement unit;

at least one memory unit which temporarily holds carriers of the antenna series in which at least the position detection of a synchronous signal is earlier than that of other series; and a diversity operation implementation unit which takes out the carriers held in said memory unit on the basis of the amount of relative delay received from said delay amount notification unit, which temporally aligns the positions of the carriers obtained from the respective antenna series, and which selects or combines for each carrier.

2. The diversity system according to claim 1, wherein said diversity operation implementation unit temporally aligns the positions of the carriers of the plurality of antenna series, compares said reliability of each antenna series for each carrier, and implements one of the following processes of: selecting a carrier of the antenna series having high reliability; and weighted combining the respective carriers on the basis of the reliability of each carrier for each antenna series.

3. The diversity system according to claim 1, wherein said memory units are provided for the respective antenna series so as to temporarily hold the carriers demodulated by said carrier demodulators of said respective antenna series, and
said diversity operation implementation unit compares the reliability of each carrier for each antenna series in the state where the carrier positions of the respective antenna series are temporally aligned, and implements one of the following processes of: selecting a carrier of the antenna series having higher reliability; and weighted combining the respective carriers on the basis of said reliability.

4. The diversity system according to claim 1, wherein said memory units are provided for the respective antenna series so as to temporarily hold the carriers demodulated by said carrier demodulators of said respective antenna series, and
said diversity operation implementation unit determines whether or not said amount of relative delay received from said delay amount notification unit is less than a predetermined value, in a case said amount of relative delay is less than said predetermined value, takes out a carrier from said memory unit on the basis of said amount of relative delay, temporally aligns the positions of the carriers of said respective antenna series, compares the reliability of each antenna series for each carrier, and implements one of the following processes of: selecting a carrier of the antenna series having high reliability; and weighted combining the respective carriers on the basis of said reliability, and in a case said amount of relative delay is at least said predetermined value, outputs a carrier of the antenna series received in advance without implementing the processes of: selecting a carrier of the antenna series having high reliability; and weighted combining the respective carriers on the basis of said reliability.

5. The diversity system according to claim 1, wherein said memory units are provided for the respective antenna series so as to temporarily hold the carriers demodulated by said carrier demodulators of said respective antenna series, and
said diversity operation implementation unit compares said amount of relative delay of the respective antenna series received from said delay amount notification unit, in a case said amount of relative delay of said arbitrary series is at least a predetermined value, cancels the carrier of an arbitrary antenna series, and in a case said amount of relative delay of the remaining series is less than said predetermined value, takes out the carrier from said memory unit on the basis of said amount of relative delays temporally aligns the positions of the carriers of the respective antenna series, compares the reliability of each antenna series for each carrier, and implements one of the following processes of: selecting a carrier of the antenna series having high reliability; and weighted combining the respective carriers on the basis of said reliability.

6. The diversity system according to claim 1, wherein said memory units are provided for the respective antenna series so as to temporarily hold the carriers demodulated by said carrier demodulators of said respective antenna series, and
said diversity operation implementation unit cancels the carrier of the series and makes the carriers of the other series effective to implement a diversity operation in a case it becomes impossible for any symbol synchronous signal position detection unit to detect symbol synchronization due to deterioration of the condition of the transmission path, and outputs a carrier by solely implementing signal processing at and after said carrier demodulator in an arbitrary one series in a case it becomes impossible for the symbol synchronous signal position detection unit to detect symbol synchronization in the antenna series other than said one arbitrary series.

7. The diversity system according to claim 6, wherein said diversity operation implementation unit detects a delay of each antenna series for one OFDM symbol unit, and switches the operations of implementation of a space diversity operation for each carrier using the carriers of the entire antenna series, of implementation of a space diversity operation for each carrier using the carrier of an arbitrary antenna series among the plurality of antenna series, and of direct output in the carrier of an arbitrary series, in accordance with the condition of said delay.

8. A diversity method for implementing space diversity for each carrier in an OFDM signal demodulation system having a plurality of antennas, comprising the steps of:
detecting symbol synchronous signals of OFDM symbols with respect to the signals received by the respective antenna series;
demodulating the carriers of OFDM in the respective antenna series and calculating reliability for each of said carriers;
measuring the amount of relative delay between the antenna series on the basis of said symbol synchronous signals of said respective antenna series;
outputting the amount of relative delay obtained by said delay measurement;
temporarily holding carriers of the antenna series in which at least position detection of a synchronous signal is early relative to the carriers of OFDM demodulated through said carrier demodulation of the respective antenna series in at least one memory unit;
taking out the carriers held by said memory unit on the basis of said amount of relative delay; and
temporally aligning the positions of the carriers obtained from the respective antenna series and selecting or combining for each carrier.

9. The diversity method according to claim 8, wherein said diversity operation processing includes the steps of:
temporally aligning the positions of the carriers of the plurality of antenna series,
comparing the reliability of each antenna series for each carrier, and
implementing one of the following processes of: selecting a carrier of the antenna series having high reliability; and weighted combining the respective carriers on the basis of the reliability of each antenna series.

10. The diversity method according to claim 8, wherein
said memory units are provided for the respective antenna
series so as to temporarily hold the carriers demodulated by said carrier demodulators of said respective
antenna series, and
said diversity operation processing includes the steps of:
temporally aligning the carrier positions of the respective
antenna series,
comparing the reliability of each antenna series for each
carrier, and
implementing one of the following processes of: selecting
a carrier of the antenna series having high reliability;
and weighted combining the respective carriers on the
basis of said reliability.

11. The diversity method according to claim 8, wherein
said memory units are provided for the respective antenna
series so as to temporarily hold the carriers demodulated by said carrier demodulators of said respective
antenna series, and
said diversity operation processing includes the steps of:
determining whether or not said amount of relative delay
is less than a predetermined value,
in a case said amount of relative delay is less than said
predetermined value,
taking out a carrier from said memory units on the basis
of said amount of relative delay,
temporally aligning the positions of the carriers of the
respective antenna series,
comparing the reliability of each antenna series for each
carrier, and
implementing one of the following processes of: selecting
a carrier of the antenna series having high reliability;
and weighted combining the respective carriers on the
basis of said reliability, and
in a case said amount of relative delay is at least said
predetermined value,
outputting a carrier of the antenna series received in
advance from said memory units without implementing
the processes of: selecting a carrier of the antenna
series having high reliability; and weighted combining
the respective carriers on the basis of said reliability.

12. The diversity method according to claim 8, wherein
said memory units are provided for the respective antenna
series so as to temporarily hold the carriers demodulated by said carrier demodulators of said respective
antenna series, and
said diversity operation processing includes the steps of:
determining whether or not said amount of relative delay
of the respective antenna series is not less than a
predetermined value,
in a case said amount of relative delay of said arbitrary
series is at least a predetermined value,
canceling the carrier of an arbitrary antenna series, and
in a case said amount of relative delay of the remaining
series is less than said predetermined value,
taking out the carrier from said memory unit on the basis
of said amount of relative delay temporally align the
positions of the carriers of the respective antenna series,
comparing the reliability of each antenna series for each
carrier, and
implementing one of the following processes of: selecting
a carrier of the antenna series having high reliability;
and weighted combining the respective carriers on the
basis of said reliability.

13. The diversity method according to claim 8, wherein
said memory units are provided for the respective antenna
series so as to temporarily hold the carriers demodulated by said carrier demodulators of said respective
antenna series, and
said diversity operation processing includes the steps of:
canceling the carrier of the series and making the carriers
of the other series effective to implement a diversity
operation in the case where it becomes impossible to
detect symbol synchronization through any antennas
due to deterioration of the condition of the transmission
path, and
outputting a carrier by solely implementing signal processing at and after the carrier demodulator in an
arbitrary one series in the case where it becomes
impossible to detect symbol synchronization through
the antenna other than said one arbitrary series.

14. The diversity method according to claim 13, wherein
said diversity operation processing includes the step of:
detecting a delay of each antenna series for one OFDM
symbol unit, and
switching the operations of implementation of a space
diversity operation for each carrier using the carriers of
the entire antenna series, of implementation of a space
diversity operation for each carrier using the carrier of
an arbitrary antenna series among the plurality of
antenna series, and of direct output in the carrier of an
arbitrary series, in accordance with the condition of
said delay.

* * * * *